(No Model.)
G. F. SIMONDS.
BALL BEARING.
No. 466,444. Patented Jan. 5, 1892.
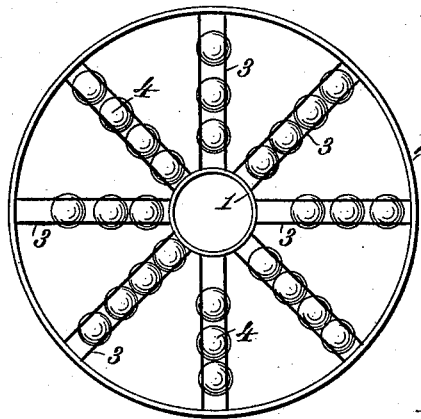
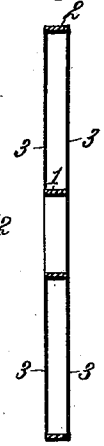
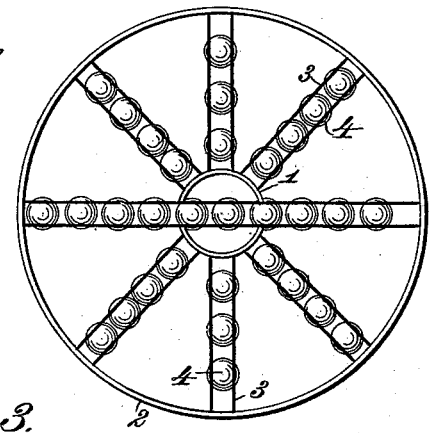
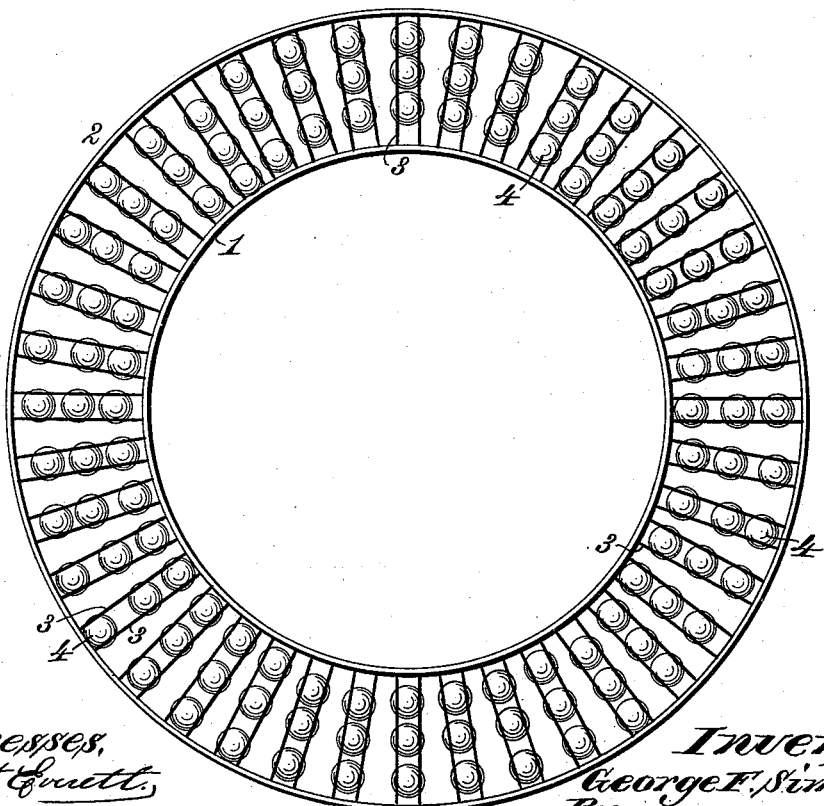
Witnesses,
Robt Emett,
J. A. Rutherford.
Inventor.
George F. Simonds.
By
James L. Norris
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,444, dated January 5, 1892.

Application filed February 24, 1891. Renewed November 6, 1891. Serial No. 411,097. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to the construction of cages for confining or retaining spherical rollers or balls in position to resist end-thrust or support the weight and pressure of rotating parts and diminish friction.

To these ends the invention comprises a ball-bearing cage consisting of concentric rings connected by double sets of wires or wire rods, between which the spherical rollers or balls are placed in such a manner as to be capable of revolving in all directions and have free lateral play, so as to move in varying lines and evenly distribute the friction and wear over the whole of the bearing-surfaces with which the balls are in contact.

The invention also consists in the construction, arrangement, and combination of parts in a thrust ball-bearing, as hereinafter set forth.

In the annexed drawings, Figure 1 is a side elevation of a ball-bearing cage constructed according to my present invention and containing spherical rollers or balls for resisting end-thrust. Fig. 2 is a similar view of a ball-bearing cage in which provision is made for a movement or play of balls across the center of the cage. Fig. 3 is a side elevation of another ball-bearing cage embodying my invention. Fig. 4 is a cross-section of a cage constructed according to my invention.

As shown in the drawings, the cage is composed of inner and outer concentrically-arranged rings 1 and 2, that are connected at suitable points by double sets of wires or wire rods 3, between which the spherical rollers or balls 4 are loosely placed and by which they are retained in operative position in such a manner as to revolve freely in all directions. The double sets of wires or wire rods 3 that retain the balls are so arranged as to form oblong compartments of uniform width, in which the balls will have free lateral play, so as to be capable of moving in varying lines, and thus evenly distribute the friction and wear over the whole of the bearing-surfaces. In the center of the cage the inner ring 1, Figs. 1 and 3, forms an opening by which the cage may be made to surround a shaft or axle. The several ball-compartments can be arranged at any desired angles with each other and at any desired distances apart, as shown in the different figures of the drawings. If it is desired to have a movement of the balls across the center of the cage, the inner ring 1 can be divided, as shown in Fig. 2, so that one of the oblong ball-compartments can be extended entirely across the cage and permit a play of the balls across or through the center. The cage shown in Fig. 2 is intended to be placed at the end of a vertical or horizontal shaft. It will be observed that a ball-bearing cage of this construction is comparatively light and inexpensive and that it provides a convenient means for inserting and removing the balls in a body and for confining them in operative position independent of the bearing-surfaces against which they act. By this construction, also, the cage can be first completed and the wires then sprung apart to permit the insertion of the balls.

What I claim as my invention is—

1. The herein-described ball-bearing cage for a thrust ball-bearing, said cage consisting of concentric rings connected by double sets of wires or wire rods arranged to form oblong compartments of uniform width, in which spherical rollers or balls are capable of revolving in all directions with free lateral play, so as to move in varying lines, substantially as set forth.

2. In a thrust ball-bearing, the combination, with spherical rollers or balls adapted to revolve in all directions, of a cage consisting of concentric rings connected by double sets of wire rods, between which the spherical rollers or balls are placed, and forming oblong compartments of uniform width, in which said balls have free lateral play, substantially as described.

In testimony whereof I have hereunto set my hand and affixed my seal in presence of two subscribing witnesses.

GEO. F. SIMONDS. [L. S.]

Witnesses:
JAMES A. RUTHERFORD,
GEO. W. REA.